US006963850B1

(12) United States Patent
Bezos et al.

(10) Patent No.: US 6,963,850 B1
(45) Date of Patent: Nov. 8, 2005

(54) COMPUTER SERVICES FOR ASSISTING USERS IN LOCATING AND EVALUATING ITEMS IN AN ELECTRONIC CATALOG BASED ON ACTIONS PERFORMED BY MEMBERS OF SPECIFIC USER COMMUNITIES

(75) Inventors: Jeffrey P. Bezos, Seattle, WA (US);
Joel R. Spiegel, Woodinville, WA (US);
Jon McAuliffe, Seattle, WA (US)

(73) Assignee: Amazon.com, Inc., Seattle, WA (US)

(*) Notice: Subject to any disclaimer, the term of this patent is extended or adjusted under 35 U.S.C. 154(b) by 0 days.

(21) Appl. No.: 09/377,447

(22) Filed: Aug. 19, 1999

Related U.S. Application Data

(60) Provisional application No. 60/128,557, filed on Apr. 9, 1999.

(51) Int. Cl.[7] ............................................... G06F 17/60
(52) U.S. Cl. ........................................................ 705/26
(58) Field of Search .............................. 705/26, 27, 25, 705/10, 35, 37; 704/13

(56) References Cited

U.S. PATENT DOCUMENTS

| | | | |
|---|---|---|---|
| 4,996,642 A | | 2/1991 | Hey |
| 5,459,306 A | | 10/1995 | Stein et al. |
| 5,737,726 A | | 4/1998 | Cameron et al. |
| 5,790,426 A | * | 8/1998 | Robinson ..................... 705/27 |
| 5,790,935 A | | 8/1998 | Payton |
| 5,794,210 A | | 8/1998 | Goldhaber et al. |
| 5,796,395 A | | 8/1998 | de Hond |
| 5,956,693 A | | 9/1999 | Geerlings |
| 5,974,396 A | * | 10/1999 | Anderson et al. ............. 704/10 |
| 6,035,283 A | | 3/2000 | Rofrano |
| 6,041,311 A | | 3/2000 | Chislenko et al. |
| 6,064,980 A | | 5/2000 | Jacobi et al. |
| 6,078,740 A | | 6/2000 | DeTreville |
| 6,078,892 A | | 6/2000 | Anderson et al. |

(Continued)

OTHER PUBLICATIONS

Peggy Watt "Varied collaborative approaches entice intranet users," Network World, Framington, Apr. 21, 1997, vol. 14, issue 16, p. S14.*
Gerald O'Connell, "New Pitch", Internet World, May 1995, pp. 54–56.*

(Continued)

*Primary Examiner*—Wynn W. Cogg
*Assistant Examiner*—Jaime E. Zurita
(74) *Attorney, Agent, or Firm*—Knobbe, Martens, Olson & Bear LLP

(57) ABSTRACT

A Web based system provides informational services for assisting customers in selecting products or other types of items from an electronic catalog of a merchant. Users of the system can create and join user communities, such as communities based on user hobbies, localities, professions, and organizations. The system also supports implicit membership communities that are based on email addresses (e.g., all users having a "nasa.com" email address), shipping/billing addresses, and other known user information. Using purchase history data collected for online users, the system automatically identifies and generates lists of the most popular items (and/or items that are becoming popular) within particular communities, and makes such information available to users for viewing. For example, in the context of an online book store users of the nasa.com community may automatically be presented a Web page which lists the bestselling book titles among nasa.com users, or may be sent email notifications of purchase events or hotselling books within the community. Another feature involves automatically notifying users interested in particular products of other users (preferably other members of the same community) that have purchased the same or similar products. For example, in one embodiment, when a user accesses a book detail page, the detail page is customized to include the names and email addresses of other members of the user's community that recently purchased the same book.

56 Claims, 11 Drawing Sheets

U.S. PATENT DOCUMENTS

| | | | |
|---|---|---|---|
| 6,101,486 A | | 8/2000 | Roberts et al. |
| 6,101,487 A | | 8/2000 | Yeung |
| 6,266,649 B1 | * | 7/2001 | Linden et al. ............... 705/26 |
| 6,269,369 B1 | * | 7/2001 | Robertson .................. 707/10 |
| 6,321,221 B1 | * | 11/2001 | Bieganski .................... 707/5 |
| 6,460,036 B1 | * | 10/2002 | Herz .......................... 707/10 |

OTHER PUBLICATIONS

Jennifer Lach, "Reading Your Mind, Reaching your Wallet" American Demographics, Ithaca, Nov. 1998, vol. 20, iss. 11, page 39, 4 pages.*

Bhattacharya et al, Understanding the bond of identification: An investigation of its correlates among art museum members Journal of Marketing, Chicago, Oct. 1995, vol. 59, issue 4, p. 46.*

Karen Angel "Are independents making a comback?" Publishers Weekly, New York, Jun. 8, 1998, vol. 245. issue 23, p. 2 5 pages.*

Nelson Wang, *Keep In Touch: New Breed of Site Links People by Common Interest,* Web Week, dated Nov. 10, 1997. (5–page web document).

Whit Andrews, *Building Communities As Way of Building Sales,* Web Week, dated Dec. 16, 1996. (2–page Web document).

Tony Silber, *Why Community Sites Are Hot,* Internet World, dated Feb. 16, 1998. (3–page Web document).

* cited by examiner amazon.com

Community Interests–Signup

Hello, Erin Indianer,

Tell us about the communities you belong to, and we will periodically tell you about what others in your communities are buying: (hold down "CTRL" to select more than one):

| | |
|---|---|
| College/University: | American University ▼ |
| Local community groups: | Aberdeen Rotary Club ▼ |
| Local outdoors clubs: | Cascade Bicycle Club ▼ |
| ⋮ | ⋮ |
| Professional Organizations: | American Medical Association ▼ |

*Click here* to add a community to the list or to create a private community

☐ Check this box if you would like to know the names and e-mail addresses of others in your communities that have recently purchased the item you are looking at. By selecting this option, you authorize Amazon.com to send your name and e-mail address to other community members. *Click Here* to limit your participation to specific communities and/or product categories ☐ Check this box if you would like to receive e-mail notifications of hot sellers in your communities. *Click Here* to limit your participation to specific communities an/or product categories ☐ Check this box if you would like to receive an e-mail notification whenever a member of one of your communities purchases a product, and to allow others in your communities to monitor your purchases (participating communities only). *Click Here* to limit your participation to specific communities and/or product categories

[Submit]

FIG. 1

COMPUTER SERVICES FOR ASSISTING USERS IN LOCATING AND EVALUATING ITEMS IN AN ELECTRONIC CATALOG BASED ON ACTIONS PERFORMED BY MEMBERS OF SPECIFIC USER COMMUNITIES

PRIORITY CLAIM

This application claims the benefit of U.S. Provisional Application No. 60/128,557, filed Apr. 9, 1999.

FIELD OF THE INVENTION

This invention relates to electronic commerce and information filtering. More specifically, this invention relates to information processing methods for assisting online users in identifying and evaluating items from a catalog of items based on user purchase histories or other historical data.

BACKGROUND OF THE INVENTION

Web sites of online merchants commonly provide various types of informational services for assisting users in evaluating the merchant' product offerings. Such services can be invaluable to an online customer, particularly if the customer does not have the opportunity to physically inspect the merchant' products or talk to a salesperson.

One type of service involves recommending products to users based on personal preference information. Such preference information may be specified by the user explicitly, such as by filling out an online form, or implicitly, such as by purchasing or rating products. The personalized product recommendations may be communicated to the customer via an email message, a dynamically-generated Web page, or some other communications method.

Two types of algorithmic methods are commonly used to generate the personalized recommendations—collaborative filtering and content-based filtering.

Collaborative filtering methods operate by identifying other users with similar tastes, and then recommending products that were purchased or highly rated by such similar users. Content-based filtering methods operate by processing product-related content, such as product descriptions stored in a database, to identify products similar to those purchased or highly rated by the user. Both types of methods can be combined within a single system.

Web sites also commonly implement services for collecting and posting subjective and objective information about the product tastes of the online community. For example, the Web site of Amazon.com, the assignee of the present application, provides a service for allowing users to submit ratings (on a scale of 1–5) and textual reviews of individual book, music and video titles. When a user selects a title for viewing, the user is presented with a product detail page that includes the title's average rating and samples of the submitted reviews. Users of the site can also access lists of the bestselling titles within particular product categories, such as "mystery titles" or "jazz CDs."

SUMMARY OF THE INVENTION

One problem with the above-described methods is that they fail to take into consideration the level of acceptance the merchant's products have attained within specific user communities. As a result, products that are very popular within the communities to which the user belongs or is affiliated may never be called to the user's attention. For example, a programming book that has attained disparate popularity among Microsoft Corporation programmers may never be called to the attention of other programmers, including other programmers at Microsoft. Even where such products are known to the user, the user's ignorance of a product's level of acceptance within specific communities, and/or the user's inability to communicate with users who are familiar with the product, can contribute to a poor purchase decision.

The present invention addresses these and other problems by providing various computer-implemented services for assisting users in identifying and evaluating items that have gained acceptance within particular user communities. The services are preferably implemented as part of a Web site system, but may alternatively be implemented as part of an online services network, interactive television system, or other type of information system. In one embodiment, the services are provided on the Web site of an online store to assist users in identifying and evaluating products, such as book titles.

The communities may include explicit membership communities that users can join through a sign-up page. The explicit membership communities may include, for example, specific universities, outdoors clubs, community groups, and professions. Users may also have the option of adding explicit membership communities to the system, including communities that are private (not exposed to the general user population). The communities may additionally or alternatively include implicit membership communities for which membership is determined without any active participation by users. Examples of implicit membership communities include domain-based communities such as Microsoft.com Users (determined from user' email addresses), geographic region based communities such as New Orleans Area Residents (determined from user' shipping addresses), and communities for which membership is based on user' purchase histories.

In accordance with one aspect of the invention, a service is provided for automatically generating and displaying community-based popular items lists. The popular items lists are preferably in the form of bestseller lists that are based on sales activities over a certain period of time, such as the last two months. By viewing these lists, users can readily identify the bestselling products within specific communities. In one embodiment, the bestseller lists for the communities of which the user is a member are automatically displayed on a personalized Web page. The bestseller lists could also be communicated by email, fax, or another communications method.

One feature of the invention involves generating bestseller lists that are based solely on Internet domains, without requiring any active user participation. These domain-based bestseller lists may be displayed automatically on the home page or other area of the Web site.

Another feature of the invention involves generating and displaying bestseller lists for "composite communities," which are communities formed from multiple implicit and/or explicit membership communities. Using this feature, a user can, for example, view a bestseller list for the composite community All U.S. Bicycle Clubs, or Domains of all Software Companies. In one embodiment, users can define their own, personal composite communities (such as by selecting from a list of non-composite communities) to create custom bestseller lists.

In accordance with another aspect of the invention, a service is provided for notifying users interested in particular products of other users that have purchased the same or similar products. In one embodiment, the service is implemented by providing user contact information on product detail pages. For example, when a user views a product detail page for a particular product (such as a kayak), the detail page may be customized to include the names and email addresses of other members of the user's community (such as a kayaking club) that recently purchased the same product. In one implementation, users can opt to expose their contact information to other community members (and thus participate in the service) on a community-by-community basis. A variation of this service involves notifying users interested in particular merchants (e.g., sellers on an online auction site) of the contact information of other users (preferably fellow community members) that have engaged in business with such merchants.

In accordance with yet another aspect of the invention, a notification service is provided for informing users of popular products within their respective communities. The popular products may be identified, for example, based on the popularity of the product within the community relative to the product's popularity within the general user population, or based simply on the number of units recently purchased within the community relative to the number of community members. In one embodiment, users can also request to be notified of all purchases made within their respective communities. The popular product and purchase event notifications are preferably sent by email (to community members that have not yet purchased the product), but may alternatively be communicated using a personalized Web page of other method. The notifications may include information for assisting users in evaluating the products, such as the number of community members that have purchased the product and/or contact information of such other users.

In accordance with another aspect of the invention, the purchase histories of users are processed to identify the "characterizing purchases" of a community, and these characterizing purchases are used to recommend items within that community. Specifically, the purchase history data of the community is compared to the purchase history data of a general user population to identify a set of items purchased within the community that distinguish the community from the general user population. Items are then implicitly or explicitly recommended to members of the community from this set, such as through popular items lists or email notifications.

The various features of the invention can also be used in the context of a system in which users merely view, download, and/or rate items without making purchases. In such systems, each viewing, downloading and/or rating event (or those that satisfy certain criteria) can be treated the same as a purchase event.

BRIEF DESCRIPTION OF THE DRAWINGS

A set of services which implement the various features of the invention will now be described with reference to the drawings of a preferred embodiment, in which:

FIG. 1 illustrates an example sign-up page for specifying community memberships and service preferences;

DETAILED DESCRIPTION OF A PREFERRED EMBODIMENT

Figure 2:
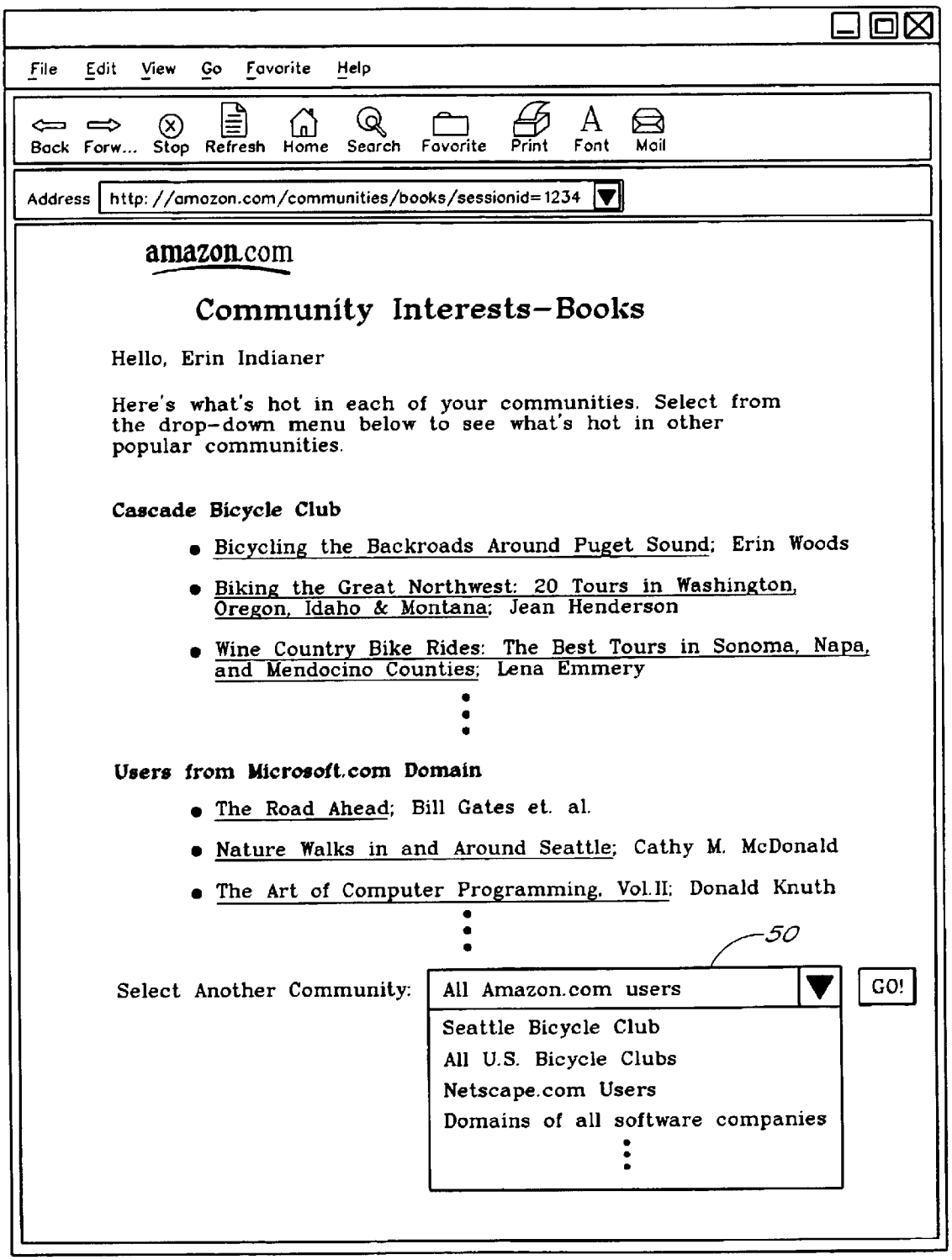
FIG. 2 illustrates a personalized community bestsellers page.

A set of online services referred to herein as "Community Interests" will now be described in detail. The services will initially be described with reference to example screen displays which illustrate the services from the perspective of end users. A set of example data structures and executable components that may be used to implement the services will then be described with reference to architectural and flow diagrams.

The illustrated screen displays, data structures and processing methods used to implement the disclosed functions are largely a matter of design choice, and can be varied significantly without departing from the scope of the invention. In addition, although multiple different services will be described as part of a single system, it will be recognized that any one of these services could be implemented without the others. Accordingly, the scope of the invention is defined only by the appended claims.

To facilitate an understanding of one practical application, the Community Interests services will be described primarily in the context of a hypothetical system for assisting users of a merchant Web site, such as the Web site of Amazon.com, in locating and evaluating book titles within an electronic catalog. It will be recognized, however, that the services and their various features are also applicable to the marketing and sales of other types of items. For example, in other embodiments, the items that are the subject of the services could be cars sold by an online car dealer, movies titles rented by an online video store, computer programs or informational content electronically downloaded to user' computers, or stock and mutual fund shares sold to online investors. Further, it should be understood that the "purchases" referred to herein need not involve an actual transfer of ownership, but could rather involve leases, licenses, rentals, subscriptions and other types of business transactions.

As with the Amazon.com Web site, it will be assumed that the hypothetical Web site provides various services for allowing users to browse, search and make purchases from a catalog of several million book, music and video titles. It is also assumed that information about existing customers of the site is stored in a user database, and that this information typically includes the names, shipping addresses, email addresses, payment information and purchase histories of the customers. The information that is stored for a given customer is referred to collectively as the customer's "user profile."

The Community Interests services operate generally by tracking purchases of books within particular user communities, and using this information to assist potential customers in locating and evaluating book titles. The services can also be used with other types of products. The communities preferably include both "explicit membership communities" that users actively join, and "implicit membership communities" that are computed or otherwise identified from information known about the user (e.g., stored in the user database). Examples of implicit membership communities include domain-based communities such as Microsoft.com Users and geographic region based communities such as New Orleans Area Residents; membership to these two types of communities may be determined from user email addresses and shipping addresses, respectively.

The system may also use implicit membership communities for which membership is based in-whole or in-part on the purchase activities of the users. For example, the implicit membership community "fishermen" may include all users that have purchased a book about fishing. Where purchase histories are used, the communities may be defined or inferred from such purchase histories using clustering techniques.

In other embodiments, the various features of the invention may be implemented using only one of these two types of communities (explicit membership versus implicit membership). In addition, the services may be implemented using "hybrid" communities that are based on information known about the user but that are actively joined; for example, the user could be notified that a community exists which corresponds to his email domain or purchase history and then given the option to join.

The Community Interests system includes four different types of services. The first, referred to herein as "Community Bestsellers," involves generating and displaying lists of the bestselling titles within specific communities. Using this feature, users can identify the book titles that are currently the most popular within their own communities and/or other communities. The bestselling titles are preferably identified based on the numbers of units sold, but could additionally or alternatively be based on other sales related criteria. In other embodiments, the lists may be based in-whole or in-part on other types of data, such as user viewing activities or user submissions of reviews and ratings.

One preferred method that may be used to identify bestselling or popular titles involves monitoring the "velocity" of each product (the rate at which the product moves up a bestsellers list) or the "acceleration" of each product (the rate at which the velocity is changing, or at which sales of the product are increasing over time). This method tends to surface products that are becoming popular. To identify the popular items within a particular community, the velocity or acceleration of each product purchased within that community can be compared to the product's velocity or acceleration within the general user population. Velocity and acceleration may be used both to generate bestseller lists and to identify "hot" products to proactively recommend to users (as discussed below).

The second service, referred to herein as "Contact Information Exchange," involves informing a user that is viewing a particular product of other users within the same community that have purchased the same or a similar product. For example, when a user within Netscape.com Users views a product detail page for a particular book on programming, the page may include the names and email addresses of other Netscape.com users that have recently purchased the title. To protect the privacy of the recent purchasers, their names and/or email addresses may be masked, in which case an email alias or a bulletin board may be provided for communicating anonymously. This feature may also be used to display the contact information of other users that have bought from or otherwise conducted business with a particular seller.

The third service, referred to as "Hotseller Notification," automatically notifies users of titles that have become unusually popular within their respective communities. For example, a user within a particular hiking club might be notified that several other users within his club have recently purchased a new book on local hiking trails. In one embodiment, a community's "hotsellers" are identified by comparing, for each title on the community's bestseller list, the title's popularity within the community to the title's popularity within the general user population. The popularities of the titles are preferably based at least in-part on numbers of units sold, but may be additionally or alternatively be based other types of criteria such as user viewing activities or user submissions of reviews and ratings.

One such method that may be used to identify the hotsellers (or for generating community recommendations in general) involves applying an algorithm referred to as the censored chi-square recommendation algorithm to the purchase or other history data of users. The effect of the censored chi-square recommendation algorithm (when applied to purchase history data) is to identify a set of "characterizing purchases" for the community, or a set of items purchased within the community which distinguishes the community from a general user population (e.g., all customers). The results of the algorithm may be presented to users in any appropriate form, such as a community popular items list, a notification email, or a set of personal recommendations. The censored chi-square algorithm is described in the attached appendix, which forms part of the disclosure of the specification. Another such method that may be used to identify the community hotsellers involves comparing each title's velocity or acceleration within the community to the titles's velocity or acceleration within the general user population.

A fourth service, referred to as "Purchase Notification," automatically notifies users of purchases (including titles and the contact information of the purchaser) made within their respective communities. This service may, for example, be made available as an option where the community members have all agreed to share their purchase information. Alternatively, users may have the option to expose their purchases to other community members on a user-by-user and/or item-by-item basis.

FIG. 1 illustrates the general form of a sign-up page that can be used to enroll with the Community Interests services. Although some form of enrollment is preferred, it will be recognized that Community Bestsellers, Hotseller Notification, Contact Information Exchange and Purchase Notification services can be implemented without requiring any active participation by the site's users. For example, all four services could be based solely on the Internet domains of the users, without requiring users to actively join communities. In addition, the communities could be defined automatically based on correlations between purchases; for example, all users that purchased more than X books within the "Business and Investing" category could automatically be assigned to a Business and Investing community.

As illustrated by FIG. 1, the sign-up page includes drop-down lists 30 for allowing the user to specify membership in one or more explicit membership communities. The communities that are presented to the user are those that are currently defined within the system. As described below, new communities may be added by system administrators, regular users, or both. In some cases, the drop-down lists 30 may be filtered lists that are generated based on information known about the particular user. For example, the selections presented in the "local community groups" and "local outdoors clubs" lists may be generated based on the user's shipping address.

Any of a variety of other interface methods could be used to collect community membership information from users. For example, rather that having the user select from a drop-down list, the user could be prompted to type-in the names of the communities to which the user belongs. When a typed-in name does not match any of the names within the system, the user may be presented with a list of "close matches" from which to choose. Users may also be provided the option of viewing the membership lists of the communities and specifying the users with which to share information.

As illustrated by the link 32 and associated text in FIG. 1, users may also be given the opportunity to add new communities to the system. In the illustrated embodiment, a user wishing to add a new community has the option of designating the community as "private," meaning that the community's existence and/or data will not be exposed to the general public. Private communities may be useful, for example, when a closed group of users wishes to privately share information about its purchases. Upon creating a private community, the user may, for example, be prompted to enter the email addresses of prospective members, in which case the system may automatically send notification emails to such users. Through a similar process, companies and organizations may be provided the option of designating their domain-based communities as private.

The sign-up page also includes check boxes 36–38 for allowing users to participate in the Contact Information Exchange, Hotseller Notification, and Purchase Notification services, respectively. In each case, the user may select a corresponding link 40–42 to an associated form page (not shown) to limit participation to specific communities and/or product categories. Each user may also be given the option to expose his or her purchases and/or contact information to others on a user-by-user basis.

When the user selects the submit button 46, the user may be asked certain questions that pertain to the selected communities, such as university graduation dates and majors. The user may also be prompted to enter authentication information that is specific to one or more of the selected communities. For example, the user may be asked to enter a community password (even if the community is not private), or may be asked a question that all members of the group are able answer. A community may also have a designated "group administrator" that has the authority to remove unauthorized and disruptive users from the group.

The user's community selections, community data, and service preferences are recorded within the user's profile. Also stored within the user's profile are any domain-based or other implicit membership communities of which the user is a member. The user's community membership profile may also be recorded within a cookie on the user's machine; this reduces the need to access the user database on requests for Web pages that are dependent on this membership profile. One method which may be used to store such information within cookies is described in U.S. provisional appl. No. 60/118,266, the disclosure of which is hereby incorporated by reference.

FIG. 2 illustrates the general form of a personalized Web page (referred to herein as the "community bestsellers page") which may be used to display the community bestseller lists. This page may be accessed, for example, by selecting a link from the site's home page. Community bestseller lists could additionally or alternatively be provided on other areas of the site. For example, the bestseller list of the Nasa.com domain could automatically be displayed on the home page for any user that has purchased a book on space exploration; or, when a user from the domain mckinsey.com makes a purchase, the user might be presented the message "would you like to see the bestsellers from the McKinsy & Co. group?"

In the FIG. 2 example, it is assumed that the user is a member of the explicit membership community Cascade Bicycle Club and the implicit membership community Microsoft.com Users. For each of these communities (as well as any other communities of which the user is a member), the page includes a hypertextual listing of top selling book titles. The methods used to generate these lists are described below. Users may also be given the option (not shown) to view all titles purchased within their respective communities.

As depicted by the drop-down list 50 in FIG. 2, the user may also be provided the option of viewing the bestseller lists of other communities, including communities of which the user is not a member. As in this example, the listing of other communities may be ordered according to the known or predicted interests of the user. A community directory structure or search engine may also be provided for assisting users in finding communities and their bestseller lists.

As further illustrated by FIG. 2, some of the communities may be "composite" communities that are formed as the union of other, smaller communities. In this example, the composite communities are All U.S. Bicycle Clubs, which consists of all regional and other bicycle club communities in the U.S., and Domains of All Software Companies, which consists of domains-based communities of selected software companies. Other examples include All Law Students and All Physicians. Bestseller lists for composite communities are particularly helpful for identifying book titles that are popular across a relatively large geographic region. For example, a user searching for a book on biking the United States, or on biking in general, would more likely find a suitable book in the All US. Bicycle Clubs bestseller list than in the Cascade Bicycle Club bestseller list.

In the preferred embodiment, a user can be a member of a composite community only through membership in one of that composite community's member, base communities. (A "base community," as used herein, is any non-composite community, regardless of whether it is part of a composite community.) The composite communities that are exposed to the general user population could be defined by system administrators; alternatively, the composite communities could be defined automatically, such as by grouping together all base communities that have certain keywords in their titles.

In one implementation, users can also define their own, "personal" composite communities, such as by selecting from a list (not shown) of base communities and assigning a community name. Using this feature, a user could, for example, define a composite community which consists of all kayaking clubs on the West Coast or of a selected group of hi-tech companies. If the user has defined a personal composite community, that community's bestseller list is preferably automatically displayed on the user's community bestsellers page (FIG. 2). As with the user's community membership profile, the definitions of any personal composite communities specified by the user may be stored within a cookie on the user's machine.

As further illustrated by FIG. 2, users can also view a bestseller list of the general user population (e.g., all Amazon.com users). The general user population is treated as special type of community (i.e., it is neither a base community nor a composite community), and is referred to herein as the "global community." Another option (not illustrated) involves allowing users to specify subsets of larger communities using demographic filtering. For example, a user within the MIT community might be given the option to view the bestselling titles among MIT alumnus who fall within a particular age group or graduated a particular year.

Figure 3:
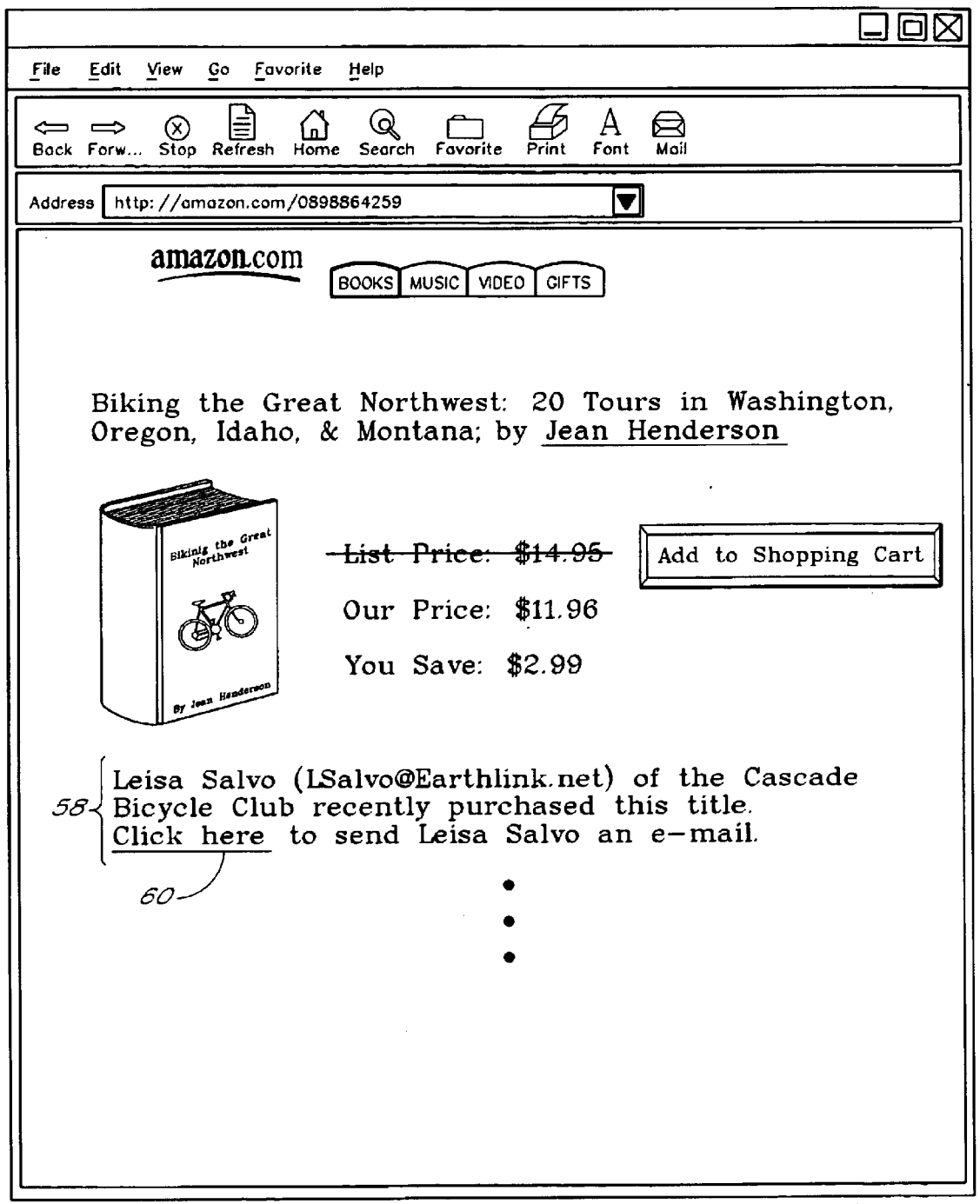
FIG. 3 illustrates an example product (book) detail page which includes contact information of other community members that have purchased the product.

FIG. 3 depicts an example product (book) detail page which illustrates one possible form of the Contact Information Exchange service. Detail pages of the type shown in FIG. 3 can be located using any of a variety of navigation methods, including performing a book search using the site's search engine or navigating a subject-based browse tree. The contact information 58 of other community members that purchased the displayed book title (preferably within a certain period of time), or possibly similar titles, is displayed at the bottom of the page. In other embodiments, the contact information may be displayed without regard to community membership.

In the illustrated embodiment, the contact information 58 includes the name, email address and common communities of the users, although telephone numbers, residence addresses, and other types of contact information could additionally or alternatively be included. In the example shown in FIG. 3, the user viewing the book detail page might contact such other users to ask their opinions about the book, or about the bike tours described therein. In addition, the contact information might be useful for arranging a group trip. As depicted in FIG. 3, the page may also include a link 60 or other type of object for sending an email or other message to the fellow community member.

In other embodiments, this feature may be used to assist users in evaluating the reputation of a particular merchant. For example, when a user views an auction of a particular seller, the contact information of other community members that bought from that seller may be displayed. Where the merchant has its own Web site, the contact information could, for example, be displayed as Web site metadata using a browser add-on of the type provided by Alexa Internet of San Francisco, Calif.

Any of a variety of methods could be used for allowing the prospective purchaser to communicate with the listed contacts anonymously. For example, as indicated above, the email addresses of the contacts could be special aliases created for communicating anonymously (in which case the prospective purchaser may similarly be assigned an email alias for the contacts to respond), or the prospective purchaser and the contacts could be given a link to a private bulletin board page.

Figure 4:
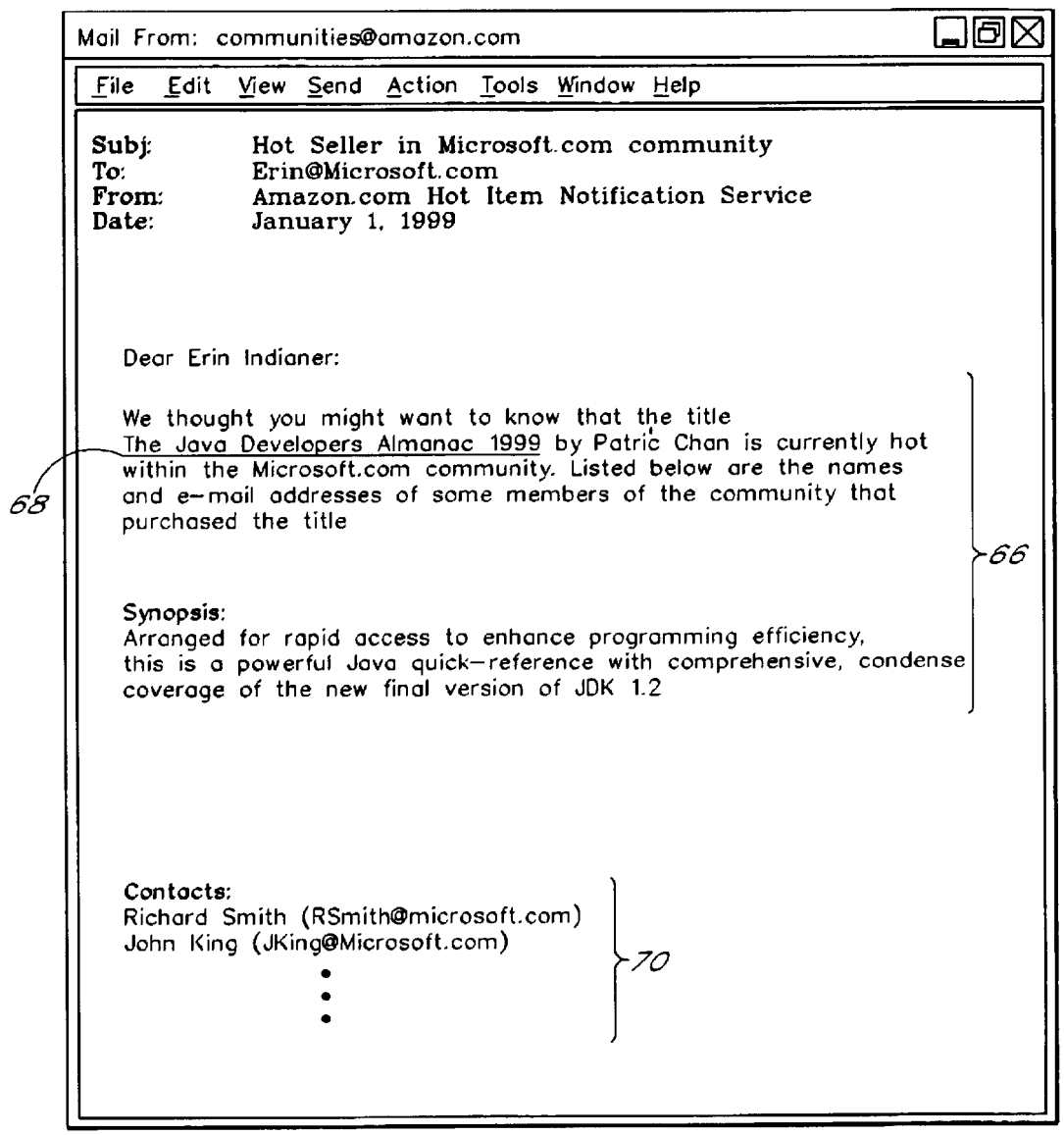
FIG. 4 illustrates an example hotseller notification email message.

FIG. 4 illustrates an example of an email document which may be used to notify community members of a hotselling book title. Similar notifications may be provided to users through customized Web pages and other communications methods. As described below, the email document is preferably sent to all participating members of the community that have not already purchased the book.

In the illustrated example, the email document includes a textual description 66 which, among other things, includes a synopsis of the book title and informs the user of the level of acceptance the title has attained within the community. The description also includes a hypertextual link 68 to the title's detail page on the site. In addition, if the recipient user participates in the Contact Information Exchange program, the email document preferably includes a listing 70 of the contact information of other community members that have purchased the book.

Email notifications sent by the Purchase Notification service (not shown) may likewise include a synopsis of the purchased product and a link to the product's detail page. In addition, where the purchaser has elected to participate in the Contact Information Exchange program, the email document may include the purchaser's contact information (and possibly the contact information of other community members who have purchased the product); for example, when User A in Community A purchases an item, an email may be sent to other members of Community A with a description of the product and User A's contact information.

Having described representative screen displays of the Community Interests services, a set of Web site components that may be used to implement the services will now be described in detail.

Figure 5:
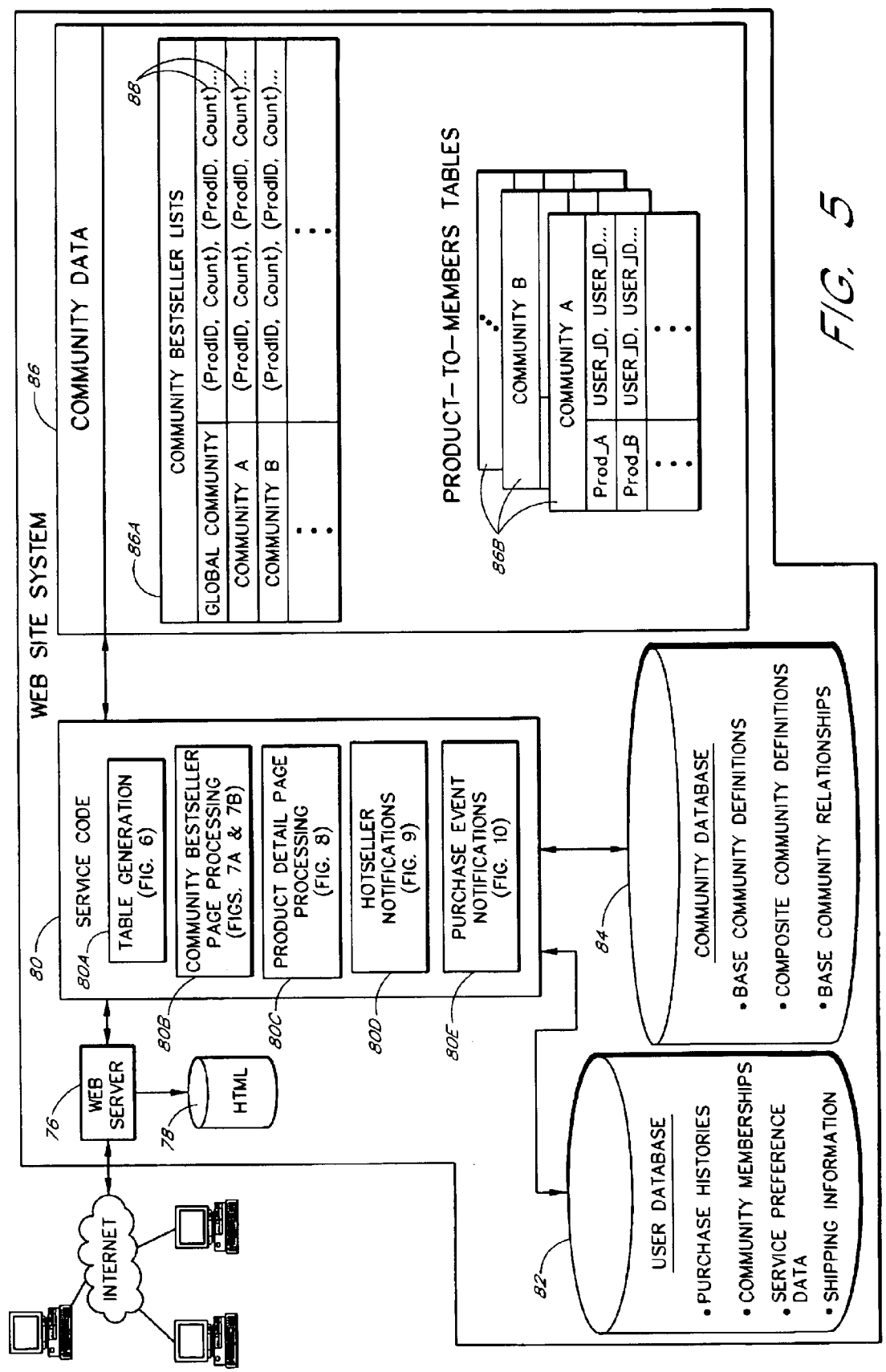
FIG. 5 is an architectural drawing which illustrates a set of components which may be used to implement the community bestseller lists, hotseller notification, and contact information exchange services.

FIG. 5 illustrates a set of Web site system components that may be used to implement the above-described features. The Web site includes a Web server 76 which accesses a database 78 of HTML (Hypertext Markup Language) and related content. The HTML database 78 contains, among other things, the basic HTML documents used to generate the personalized sign-up, community bestsellers, and product detail pages of FIGS. 1–3. The Web server 76 accesses service code 80, which in-turn accesses a user database 82, a community database 84, a bibliographic database of product data (not shown), and a database or other repository of community data 86. The various databases are shown separately in FIG. 5 for purposes of illustration, but may in practice be combined within one or more larger database systems. The service code 80 and other executable components may, for example, run on one or more Unix or Windows NT based servers and/or workstations.

The community data 86 includes a "community bestseller lists" table 86A which contains, for the global community and each base community, a listing of the currently bestselling book titles. In some implementations, the listing for the global community is omitted. In the illustrated embodiment, each entry 88 in each bestseller list includes: (a) the product ID (ProdID) of a book title, and (b) a count value which represents, for a given time window, the number of copies purchased by members of the community. The product IDs may be assigned or processed such that different media formats (e.g., paperback, hardcover, and audio tape) of the same title are treated as the same item. As described below, the community bestseller lists table 86A is used both for the generation of bestseller lists and the generation of hotseller notifications.

The community data 86 also includes, for each base community, a respective product-to-member mapping table 86B which maps products to the community members that have recently purchased such products (e.g., within the last 2 months). For example, the entry for product Prod—A within the table 86A for Community A is in the form of a listing of the user IDs and/or contact information of members of Community A that have recently purchased that product. In the preferred embodiment, only those community members that have opted to participate in the Contact Information Exchange service are included in the lists.

As mentioned above, the user database 82 contains information about known users of the Web site system. The primary data items that are used to implement the Community Interests service, and which are therefore shown in FIG. 5, are the user' purchase histories, community memberships, service preference data (e.g., whether or not the user participates in the Contact Information Exchange and Hotseller Notification services), and shipping information. Each user's purchase history is in the general form of a list of product IDs of purchased product, together with related information such as the purchase date of each product and whether or not the purchase was a designated by the user as a "gift." Purchases designated as gifts may be ignored for purposes of evaluating community interests. Each user's database record also preferably includes a specification of any personal composite communities the user has defined, for viewing customized bestseller lists.

With further reference to FIG. 5, the community database 84 contains information about each base community (including both explicit and implicit membership base communities when both types are provided) that exists within the system. This information may include, for example, the community name, the type of the community (e.g., college/university, local community group, etc.), the location (city, state, country, etc.) of the community, whether the community is private, whether the community participates in the Purchase Notification service, any authentication information required to join the community, and any community policies (e.g., by joining, all users agree to expose their purchases to other members). For implicit membership communities, the database 84 may also include information about the user database conditions which give rise to membership. As indicated above, the information stored within the communities database 84 may be generated by end users, system administrators, or both.

The community database 84 also includes information about any composite communities that have been defined by system administrators. For each composite community, this information may include, for example, the community name and a list of the corresponding base communities. For example, for the All Bicycle Clubs community, the database would contain this name and a list of all existing bicycle club base communities.

As depicted by FIG. 5, the community database 84 may also contain information about relationships or associations between base communities. This information may be specified by system administrators, and may be used to identify similar communities for display purposes. For example, when a user of the Microsoft.com Users community views the community bestsellers page (FIG. 2), the associated community Netscape.com Users may automatically be displayed at the top of the drop-down list 50, or its bestseller list be displayed on the same page.

As illustrated by FIG. 5, the service code 80 includes five basic processes 80A–80E that are used to implement the Community Interests services. (As used herein, the term "process" refers to a computer memory having executable code stored therein which, when executed by a computer processor, performs one or more operations.) Each process is illustrated by one or more flow diagrams, the figure numbers of which are indicated in parenthesis in FIG. 5. The first process 80A is an off-line process (meaning that it is not executed in response to a page request) which is used to periodically generate the tables 86A and 86B based on information stored in the user and community databases 82, 84. Processes 80B–80D use these tables to perform their respective functions.

The second process 80B is an online process which is used to generate personalized community bestsellers pages of the type shown in FIG. 2. The third process 80C is an online process which is used to generate product detail pages with contact information as shown in FIG. 3; and which may also be used to compile contact information to be displayed within notification emails of the type shown in FIG. 4. The fourth process 80D is an offline process which is used to identify and notify users of hotselling products within specific communities. The fifth process 80E is used to implement the Purchase Notification service.

Figure 6:
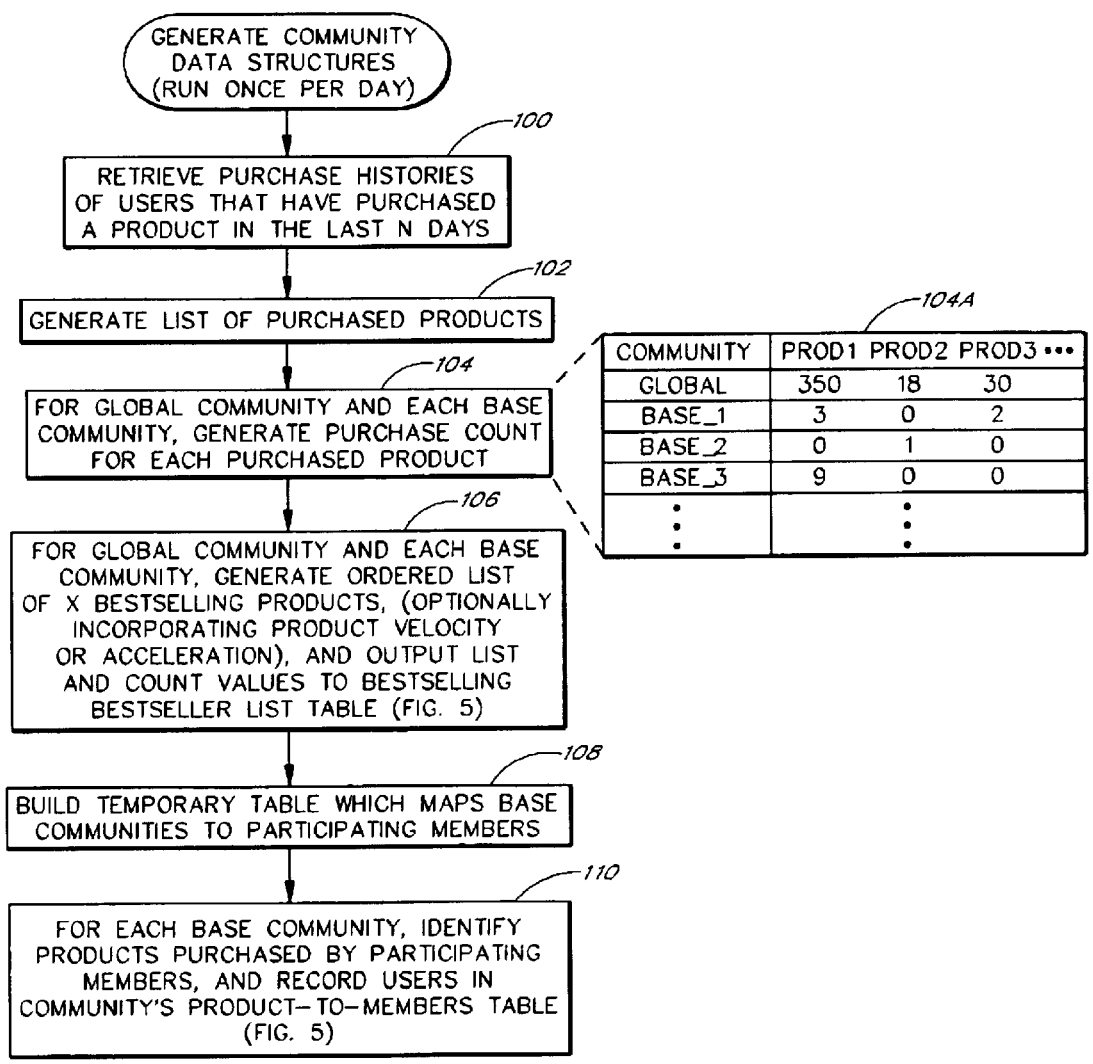
FIG. 6 illustrates an offline process for generating the community bestseller lists table and the product-to-member tables of FIG. 5.

FIG. 6 illustrates the steps performed by the table generation process 80A to generate the tables 86A, 86B. The process may, for example, be executed once per day at an off-peak time. A process which updates the tables in real-time in response to purchase events may alternatively be used. In step 100, the process retrieves the purchase histories of all users that have purchased products within the last N days (e.g., 60 days). Submissions of ratings or reviews may be treated as purchases and thus included in the purchase histories. The variable N specifies the time window to be used both for generating bestseller lists and for identifying hotselling items, and may be selected according to the desired goals of the service. Different time windows could alternatively be used for generating the bestseller lists and for identifying hotselling items; and different time windows could be applied to different types of communities.

In step 102, the retrieved purchase histories are processed to build a list of all products that were purchased within the last N days. Preferably, this list includes any products that were purchased solely by global community members, and thus is not limited to base community purchases.

In step 104, the process uses the data structures obtained from steps 100 and 102 to generate a temporary purchase count array 104A. Each entry in the array 104A contains a product count value which indicates, for a corresponding community: product pair, the number of times the product was purchased by a member of the community in the last N days. For example, the array 104A shown in FIG. 6 indicates that a total of 350 users purchased product "PROD1," and that three of those purchases came from base community "BASE—1." A pseudocode listing of a routine that can be used to generate the array is shown in Table 1. Multiple purchases of the same product by the same user are preferably counted as a singe purchase when generating the array.

TABLE 1

For each user;
    For each product purchased by user in last N days;
        For each community of which user is a member;
            increment purchase_count(community, product)

In step 106, the data stored in the array is used to generate the community bestseller lists. This task involves, for each base community and the global community, forming a list of the purchased products, sorting the list according to purchase counts, and then truncating the list to retain only the X (e.g., 100) top selling titles. A longer bestsellers list (e.g., the top selling 10,000 titles) may be generated for the global community, as is desirable for identifying community hotsellers.

As indicated by the parenthetical in block 106, product velocity and/or acceleration may be incorporated into the process. The velocity and acceleration values may be calculated, for example, by comparing purchase-count-ordered lists generated from the temporary table 104A to like lists generated over prior time windows. For example, a product's velocity and acceleration could be computed by comparing the product's position within a current purchase-count-ordered list to the position within like lists generated over the last 3 days. The velocity and acceleration values can be used, along with other criteria such as the purchase counts, to score and select the products to be included in the bestseller lists.

The bestseller lists are written to a table 86A of the type depicted in FIG. 5, and the new table replaces any existing table. The bestsellers lists of base communities that have less than a pre-specified threshold of total sales (e.g., less than 5) may optionally be omitted from the table 86A. Bestseller lists for the composite communities defined by system administrators could also be generated as part of the FIG. 6 process, or could be generated "on-the-fly" as described below.

The last two steps 108, 110 of FIG. 6 are used to generate the product-to-member mapping tables 86B of FIG. 5. The first step 108 of this process involves generating a temporary table (not shown) which maps base communities to corresponding members that have opted to participate in the Contact Information Exchange program ("participating members"). In step 110, this temporary table and the purchase histories of the participating members are used to generate the product-to-member mapping table 86B for each base community. The contact information of the participating members may also be stored in these tables 86B to reduce accesses to the user database 82. Although a separate table 86B is preferably generated for each base community, a single table or other data structure could be used.

Any of a variety of other types of user activity data could be monitored and incorporated into the FIG. 6 process as a further indication of product popularity. Such data may include, for example, "click-through" events to product detail pages, "add to shopping cart" events, and product ratings and reviews submitted by users.

Figure 7A:
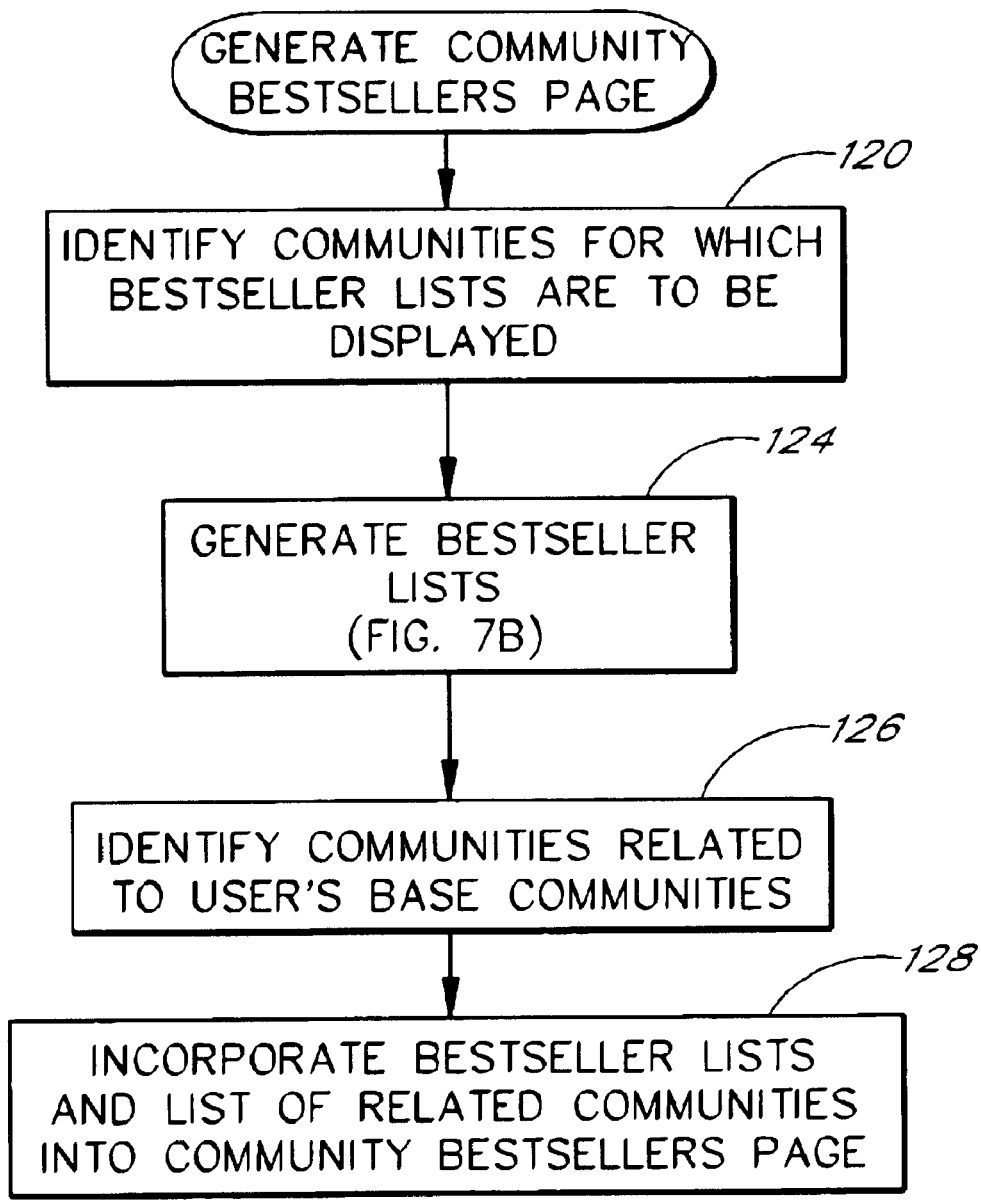
FIG. 7A and 7B illustrate an online (real time) process for generating personalized community bestseller pages of the type shown in FIG. 2.
Figure 7B:
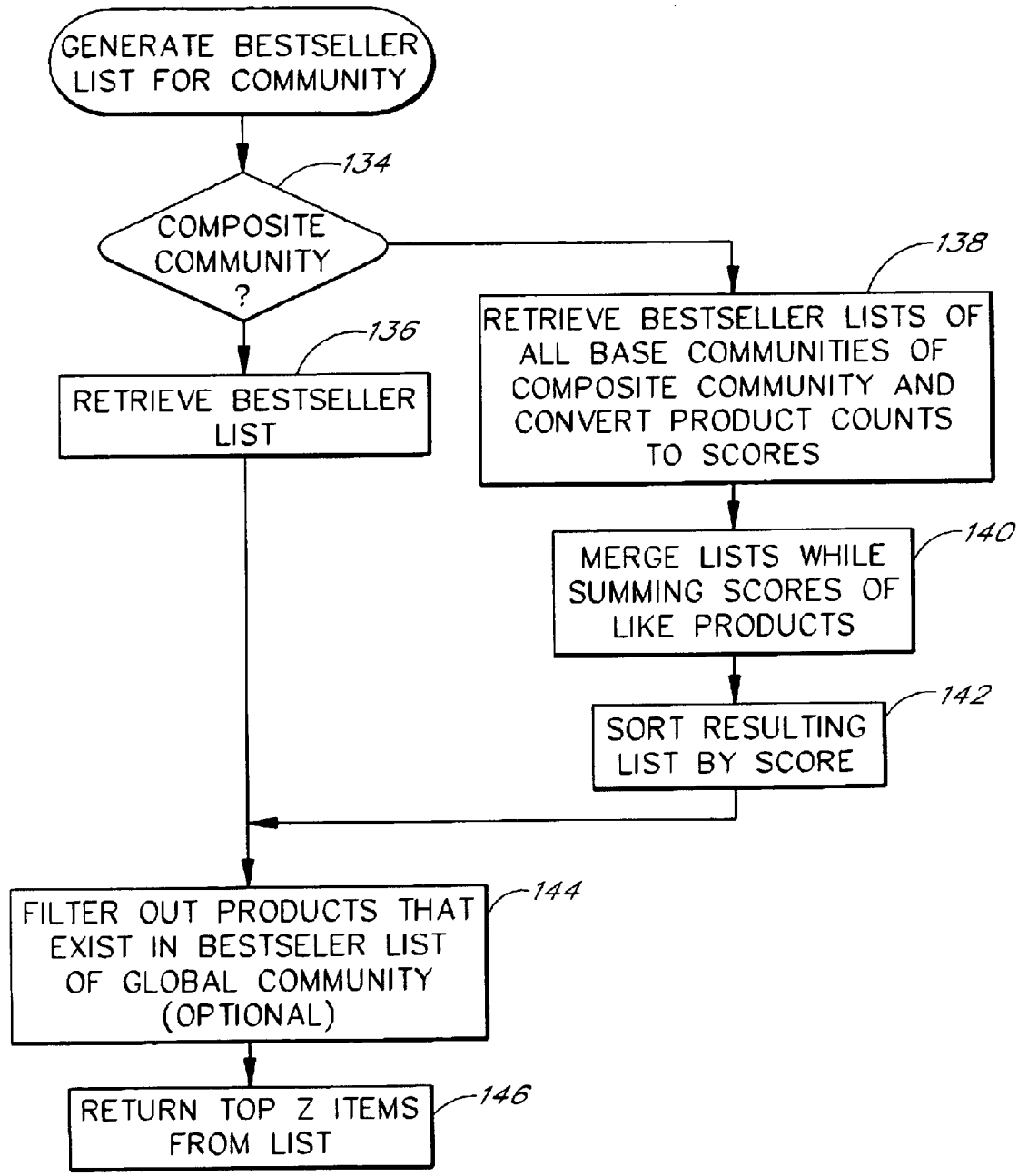

FIGS. 7A and 7B illustrate the steps that are performed by the community bestseller processing code 80B to generate personalized community bestseller pages of the type shown in FIG. 2. The first step 120 in FIG. 7A involves generating a list of the communities for which bestseller lists are to be generated and displayed. If the user has already selected one or more communities from the drop down box 50 (FIG. 2), these selected communities are included in this list. If the user's identity is known, the user's base communities and personal composite communities, if any, may be added to this list. If the list is empty at this point, a set of default communities may used. User identities are preferably determined using browser cookies, although a login procedure or other authentication method could be used. In other implementations, the community bestseller lists may be displayed without regard to the user's community membership profile.

The next step 124 involves generating the bestseller lists for each of the selected communities. The process is illustrated by FIG. 7B and is described below. In step 126, the process identifies any communities that are related to the user's base communities, so that these related communities can be displayed within or at the top of the drop-down list 50 (FIG. 2). Any composite community which includes one of the user's base communities may automatically be included in this list. In addition, information stored in the community database 84 may be used to identify related base communities. In other implements, this step 126 may be omitted. Finally, in step 128, the bestseller lists and the list of related communities are incorporated into the community bestsellers page.

With reference to FIG. 7B, if the community is not a composite community (as determined in step 134), the community's bestseller list is simply retrieved from the table 86A (step 136). Otherwise, the bestseller lists of all of the composite community's member base communities are retrieved and merged (steps 138–142) to form the bestseller list. As part of the merging process, the product count values could optionally be converted to normalized score values (step 138) so that those communities with relatively large sales volumes will not override those with smaller sales volumes. For a given product within a given bestseller list, the score may be calculated as (product's purchase count)/(total purchase count of bestseller list). The lists are then merged while summing scores of like products (step 140), and the resulting list is sorted from highest to lowest score (step 142). If the composite community is one that has been defined by system administrators (as opposed to a personal composite community defined by the user), the resulting bestseller list may be added to the table 86A or otherwise cached in memory to avoid the need for regeneration.

As depicted in step 144, one optional feature involves filtering out from the bestseller list some or all of the products that exist within the global community's bestseller list. For example, any book title that is within the top 500 bestseller's of the general population may automatically be removed. Alternatively, such titles could be moved to a lower position within the list. This feature has the effect of highlighting products for which a disparity exists between the product's popularity within the global community versus the community for which the bestseller list is being generated. This feature may be provided as an option that can be selectively enabled or invoked by users. Products could additionally or alternatively be filtered out based a comparison of the product's velocity or acceleration within the particular community to the product's velocity or acceleration within the global community.

As illustrated by step 146, the bestseller list is truncated (such as by taking the top 10 entries) and then returned to the process of FIG. 7A for incorporation into the Web page. The FIG. 7B process is repeated for each community to be included within the community bestsellers page.

Figure 8:
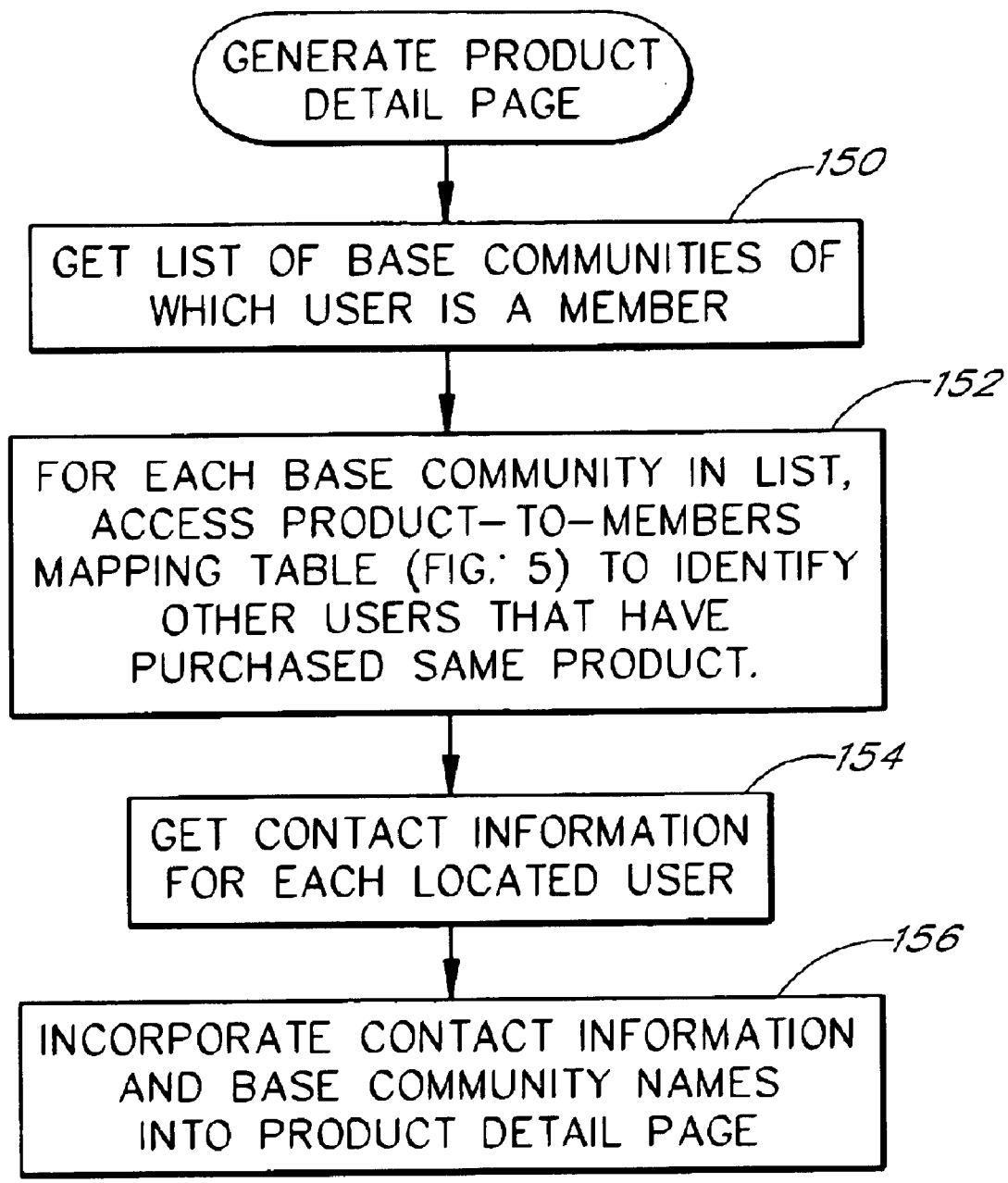
FIG. 8 illustrates an online process for generating personalized product detail pages of the type shown in FIG. 3.

FIG. 8 illustrates the steps that are performed by the product detail page process 80C to generate detail pages (as in FIG. 3) for participants in the Contact Information Exchange program. As indicated above, product detail pages can be accessed using any of the site's navigation methods, such as conducting a search for a title. In step 150, a list of the base communities of which the user is a member is obtained—either from a browser cookie or from the user database 82. In step 152, for each base community in this list, that community's product-to-member mapping table 86B (FIG. 5) is accessed to identify any other users within the community that have purchased the product. In step 154, the contact information for each such user is read from the table 96B or from the user database 82. In step 156, the contact information and associated base community names are incorporated into the product's detail page.

Figure 9:
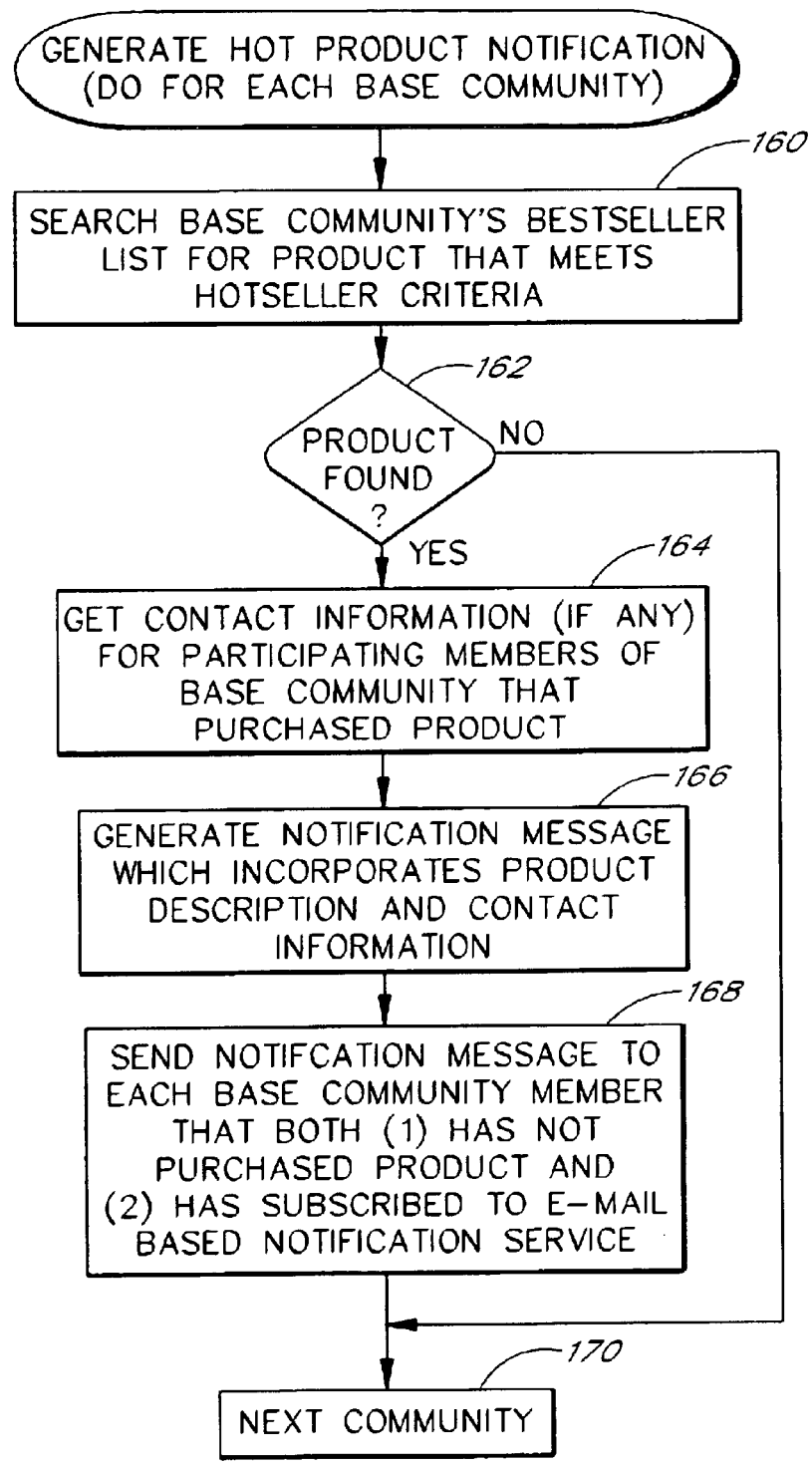
FIG. 9 illustrates an offline process for generating email notifications of hotselling products as in FIG. 4.

FIG. 9 illustrates the off-line sequence of steps that are performed by the hotseller notifications process 80D. The general purpose of this process is to identify, within each base community, any "hotselling" products (based on pre-specified criteria), and to call such products to the attention of those within the community that have not yet purchased the products. The sequence 160–168 is performed once for each base community. In other implementations, the process could also be used to identify hotsellers in composite communities.

In step 160, the process sequences through the products in the community's bestseller list while applying the hotseller criteria to each product. If multiple products qualify as hotsellers, only the "best" product is preferably selected. In one embodiment, a product is flagged as a hotseller if more than some threshold percentage (e.g., 5%) of the community's members have recently purchased the product, as determined from the data within the community bestseller lists table 86A. This threshold could be a variable which depends upon the number of members of the community.

In another embodiment, the position of the product within the community's bestseller list is compared to the product's position, if any, within the global community's bestseller list. For example, any title that is in one of the top ten positions within the community's list but which does not appear in the top 1000 bestsellers of the general population may automatically be flagged as a hotseller. In addition, as mentioned above, hotsellers may be identified by comparing the product's velocity or acceleration within the community to the product's velocity or acceleration within the global community. In addition, the censored chi-square algorithm described in the attached appendix may be used to identify the hotsellers. In other implementations, these and other types of conditions or methods may be combined.

If no hotseller is found for the community (step 162), the process proceeds to the next base community (step 170), or terminates if all base communities have been processed. If a product is found, the product-to-member mapping table 86B (FIG. 5) is accessed to identify and obtain the contact information of any participating members that have purchased the product (step 164). In step 166, the process generates an email document or other notification message. As in FIG. 4, this message preferably includes the contact information and a description of the product. In other implementations, the notifications may be communicated by facsimile, a customized Web page, or another communications method.

In step 168, the notification message is sent by email to each base community member who both (1) has not purchased the product, and (2) has subscribed to the email notification service. Such members may be identified by conducting a search of the user database 82. The notification messages could alternatively be sent out to all community members without regard to (1) and/or (2) above. For users that have not subscribed to the Contact Information Exchange service, the contact information may be omitted from the notification message.

Figure 10:
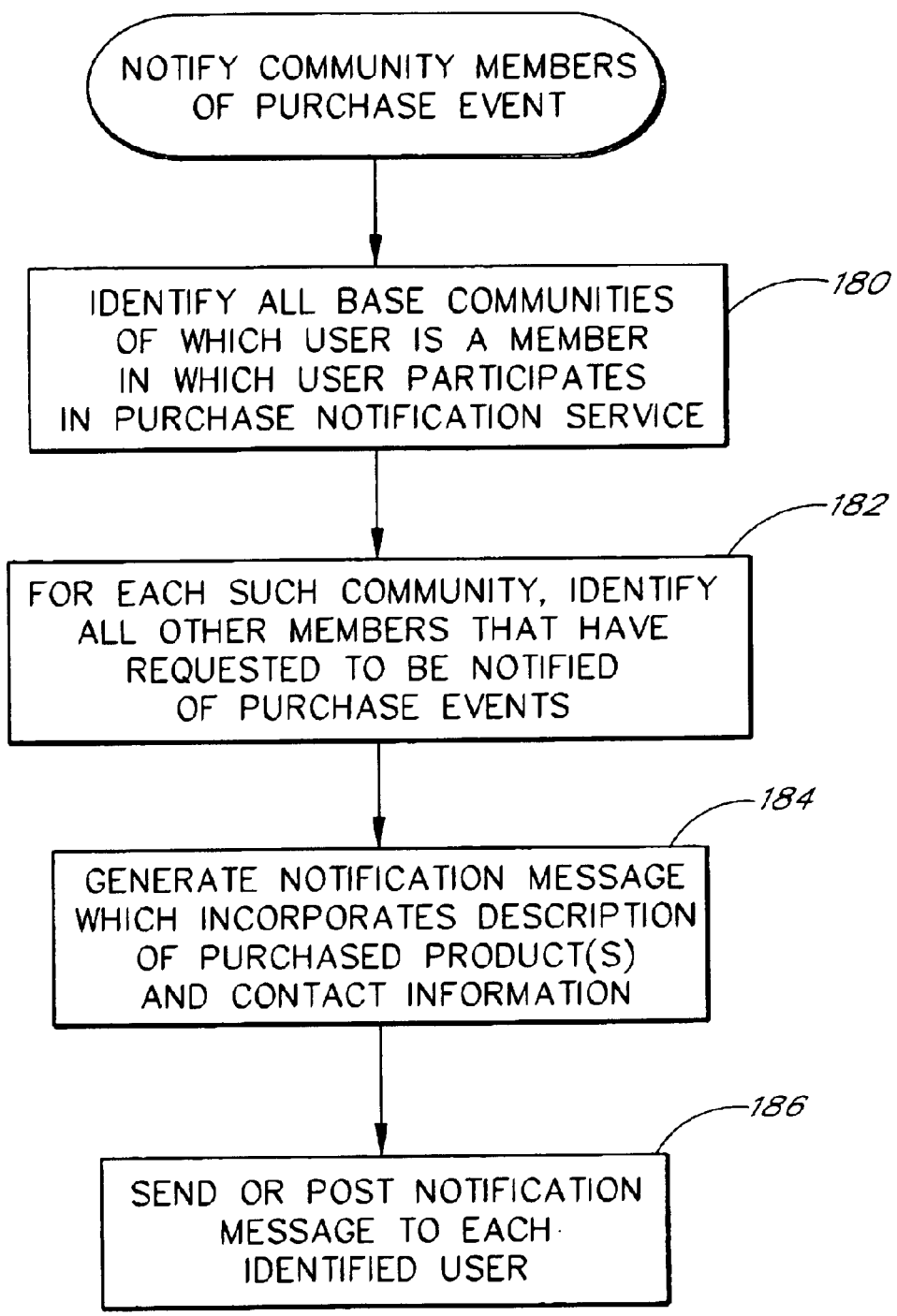
FIG. 10 illustrates a process for notifying community members of purchases made within the community.

FIG. 10 illustrates a sequence of steps that may be performed to implement the Purchase Notification service. This process may be implemented whenever a user completes the check-out process to purchase one or more products. In step 180, the user's profile is checked to identify any base communities in which the user participates in the Purchase Notification service. For each such community, all other participating members are identified in step 182. In step 184, a notification message is generated which includes a description of the purchased product(s) and the name of the common community. If the user participates in the Contact Information Exchange service, the contact information of the purchaser may also be included within this message. In step 186, the notification message is sent by email to all participating members identified in step 182. Alternatively, purchase notifications that have accumulated over a period of time may be displayed when a user logs into the system.

The various community-related features described above can also be implemented in the context of a network-based personal information management system. One such system is implemented through the Web site of PlanetAll (www.planetall.com). Using this system, users can join various online communities and can selectively add members of such communities to a virtual, personal address book. In addition, each user can selectively expose his or her own personal information to other community members on a user-by-user and datum-by-datum basis. Additional details of this system are described in U.S. appl. No. 08/962,997 titled NETWORKED PERSONAL CONTACT MANAGER filed Nov. 2, 1997, the disclosure of which is hereby incorporated by reference.

In the context of this and other types of network-based address book systems, the contacts listed within a user's address book may be treated as a "community" for purposes of implementing the above-described features. For example, a user may be given the option to view the products purchased by other users listed in his or her address book (or a particular section of the address book), or to view a bestsellers list for such users. Further, when the user views a product detail page (or otherwise selects a product), the contact information of other users within the address book that bought the same product may be displayed. Further, a user may be given the option to conduct a search of a friend's address book to locate another user that purchased a particular product.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims.

Appendix

1. Overview

The censored chi-square recommendation algorithm constructs a set of candidate recommendations for a predefined group of customers. It then conducts a statistical hypothesis test to decide whether or not these candidate recommendations are really a result of group preferences which differ from the preferences of the overall customer base. If the conclusion is that group preferences do differ significantly from overall customer preferences, the recommendations are presented to the group.

The inputs to the censored chi-square algorithm are the purchases made by the group (over some time period) and the purchases made by all customers (over the same time period). Other types of events, such as item viewing, downloading and rating events, can additionally or alternatively be used.

The purchases of the entire customer base are used to formulate expectations about how many customers in the group will have purchased each available item, given the total number of purchases by the group. The "group purchase count" for each item is the number of customers in the group who actually purchased the item. The candidate recommendations are first restricted to be those items whose group purchase counts exceeded expectations. Of these candidates, only those items with the largest group purchase counts are then retained. These final candidates are sorted according to how much their group purchase counts exceeded expectations (subject to a normalization). The values used to sort the candidates are called the "residuals".

These residuals form the basis of a test statistic which leads to an estimate of the probability that expectations about the group are the same as expectations about all customers. If this probability is low, it is inferred that the group's preferences are significantly different from the preferences of all customers, and the recommendations are returned as output. If the probability is high, on the other hand, then little evidence exists to suggest the group's preferences differ from overall preferences, so no recommendations are returned.

2. Algorithm for Constructing Censored Chi-Square Recommendations

Let A be the set of customers in the purchase circle (community) under consideration. With respect to the minimum lookback horizon L such that S—{.99} (defined below) is at least 5:

Define P={ <c, i>: c \in A and c purchased item i at least once between today and L periods ago }

Let |P|=n.

Define I={ i:there exists a c \in A such that <c, i>\in P }

Define observed counts, expected counts, residuals and standardized residuals as follows: o(i)=|{ c:c \in A and c purchased i within L} |, i \in I e(i)=n * phat—i, phat—i is the estimated purchase probability for I, i \in I r(i)=o(i)−e(i), i \in I r—s(i)=r(i) / sqrt(e(i)), i \in I Define I* \subset I={ i:i \in I and r(i)>0 }

Let S be the image of I* under o(i). Let |S|=d.

Let S—(1), S—(2), . . . , S—(d) be the order statistics of S. thus S—(d) is the number of distinct customers who purchased the most-purchased (positive- residual) item. Note ties are common, so that a subsequence S—(i), S—(i+1), . . . , S—(i+j) may have all elements equal.

Let S—{c}, 0<=c<=1, be the cth quantile of S, that is, (100*c)% of the other elements in S are less than or equal to S—{c}. Interpolate and break ties as necessary to determine S—{c}. Let SR be the set of standardized residuals which correspond to elements of S that are >=S—{.99}.

Let |SR|=m.

Let SR—(1), . . . , SR—(m) be the order statistics of SR.

Call the desired number of recommendations r. Then the order statistic index of the final recommendation candidate is r*=max(m−r+1, 1).

Compute T=\sum—{i=r*} ^m SR—(i)^2

Compute the p-value of T, i.e. Pr(X>T) where X ~cX^2(n, r*).

If the p-value achieves the desired significance level, then the recommended items for the circle, in order, are SR—(m), SR—(m−1), . . . , SR—(r*+1), SR—(r*).

3. Estimating the Sampling Distribution of the Censored Chi-Square Statistic

To construct a numerical approximation of the censored chi-square sampling distribution under the null hypothesis, we employ a statistical resampling technique called the bootstrap. The idea is straightforward. We create a group of customers by simple random sampling with replacement from the entire customer base. By construction, the expected purchase allocations of such a group follow the probability model of our null hypothesis. We emphasize that this is simply an algebraic consequence of the method used to fit the null model, and in fact the linearity of expectation guarantees that it holds algebraically regardless of any interdependencies our model ignored in the joint distribution over purchase probabilities.

We then compute the censored chi-square statistic for this random group, as presented above. We can think of the value so obtained as an approximate sample drawn from the censored chi-square's null distribution. By repeatedly (1) constructing a set of customers randomly and (2) computing its censored chi-square statistic, we approximate the so-called empirical distribution of the cX^2 under the null hypothesis. Under mild to moderate probabilistic conditions, the empirical distribution converges to the true null distribution of the statistic. Thus an approximate 100(1−alpha)% significance level test for circle idiosyncrasy can be conducted by comparing the circle's CX^2 statistic value to the (alpha)th quantile of the bootstrapped empirical distribution. Also note that, as a sum of (theoretically) independent random variables, the cX^2 sampling distribution should converge asymptotically to the normal distribution as the number of observations over which the statistic is computed grows large. We can determine when application of the normal theory is feasible by testing goodness-of-fit of the bootstrapped distribution to the normal, for example using the Kolmogorov-Smirnoff statistic.

Under the assumptions of the null hypothesis, the value of the cX^2 can be shown to grow linearly in the total purchase count of the circle (community) as well as the number of items to recommend (i.e. terms in the cX^2 summation). Since the purchase probabilities are constants under the null hypothesis, these are the only two variables with which the cX^2 grows. So in theory we would want to bootstrap a distribution for each possible <n, r> pair, where n is the circle's purchase count and r the number of recommended items. In practice, both n and r are random variables which depend on the particular set of random customers we assemble at each iteration of the bootstrap. So we bootstrap various random group sizes at various lookback horizons, then recover the sampling distributions from the <n, r> values implicitly obtained in the course of each iteration. We can then construct approximate empirical distributions for <n, r> intervals which are large enough to contain enough observations for us to get useful convergence to the true null distribution. With these parameterized approximate sampling distributions available, we conduct a hypothesis test using the sampling distribution whose <n, r> interval contains the values of n and r actually obtained for the circle being tested.

IV. Determination of ODtimal Lookback Horizon

Before testing the hypothesis that a particular purchase circle follows the probability model to allocate its purchases across items, we decide how much of the circle's available transaction data to use in computing the censored ehi-square test statistic. We choose to utilize data looking sequentially backwards in time, without weighting observations. Thus the question of how much data to use is equivalent for our purposes to asking how many prior days of data to include in the computation. We refer to this number of days as the lookback horizon associated with the purchase circle.

In general, the power of a test statistic (the probability the test statistic will detect deviations from the null hypothesis) is a nondecreasing function of the amount of data provided, so using all available data normally won't harm our statistical inferences. There are other drawbacks in our situation, however. First, the stationarity assumption behind the purchase probability estimates is at best only locally correct. The further back in time we look, the more likely it is that nonstationarity in the purchase probabilities will manifest itself in our hypothesis tests. Since this nonstationarity impacts the bootstrap as well, it is actually a pervasive problem that can't be circumvented with simple resampling, and it will tend to cause us to detect circle idiosyncrasies where none actually exist.

Second, without researching the power function of the censored chi-square, we cannot make any statements about the expected power benefits of incrementally larger datasets. In light of this, it makes sense to let computational efficiency dictate the sizes of the datasets used in hypothesis testing. In other words, knowing nothing about the relative value of larger datasets, we will use the smallest dataset which allows a given purchase circle to satisfy the reasonability criterion. Currently this means that the observed count for the 99th percentile of the circle's positive-residual items, ranked by observed count, must be at least 5.

Determining the minimum lookback horizon consistent with this constraint would in general require repeated computations at successively longer horizons for a particular circle. Instead, for computational efficiency, we will forecast a horizon that has high probability of satisfying the constraint, accepting that in expectation some small percentage of circles will fail to satisfy it. The forecast is produced as a side effect of the bootstrap computation (see above). Each random group size we bootstrap over will have iterations at many horizons. At each horizon, some fraction of the iterations will fail the reasonability criterion. We record all such failures. Roughly speaking, the fraction of failures should decrease as lookback horizon increases. Given a purchase circle whose minimum lookback horizon we want to forecast, we find the bootstrap group size it is close to, then pick the shortest horizon which had an acceptable failure rate. If no bootstrapped horizon had an acceptably low rate, we choose the longest horizon and accept that many idiosyncratic circles of that size will escape detection by failing the reasonability criterion.

What is claimed is:

1. A method of assisting users in selecting items from an electronic catalog of items, the catalog accessible to users of an online sales system that provides services for allowing users to purchase items from the catalog, the method comprising:
   providing a database which contains information about a plurality of user communities, wherein different communities represent different subsets of users of the sales system;
   tracking, via computer, online purchases of items from the sales system by the users to generate purchase history data, and storing the purchase history data in a computer memory:
   processing, via computer, at least the purchase history data to identify at least one item which, based on actions of both members and non-members of a selected community of said plurality of user communities, has a popularity level that is substantially greater within the selected community than outside the selected community; and
   electronically notifying users that the at least one item is popular within the selected community to assist users in selecting items from the electronic catalog.

2. The method of claim 1, wherein electronically notifying users comprises generating a Web page which includes a community-based most popular items list.

3. The method of claim 2, wherein the most popular items list is a bestsellers list.

4. The method of claim 1, wherein electronically notifying users comprises automatically generating and sending an email message to members of the selected community.

5. The method of claim 4, wherein the email message contains contact information of at least one member of the community that has purchased an item described in the email message.

6. The method of claim 1, wherein processing the purchase history data to identify at least one item comprises identifying a set of characterizing purchases for the community.

7. The method of claim 1, wherein the community is an implicit membership community.

8. The method of claim 7, wherein the community is based on email addresses of users.

9. The method of claim 1, wherein the community is an explicit membership community.

10. The method of claim 1, wherein the community is derived from an electronic address book of a user.

11. The method of claim 1, wherein the community is a composite community which comprises multiple other communities of the database.

12. The method as in claim 1, wherein processing the purchase history data comprises excluding substantially, from consideration purchase history data falling outside a selected look-back period, so that calculated item popularity levels strongly reflect current interests of users.

13. A system for assisting users of an online sales system in selecting items from an electronic catalog of items, the system comprising:
   at least one electronic database which contains purchase history data for users of the sales system, and which contains information about a plurality of user communities wherein different communities represent different subsets of users of the sales system; and
   a computer system that executes a process which analyzes at least the purchase history data to identify items that have substantially higher popularity levels within particular communities of the plurality of communities relative to their respective popularity levels among a general user population, and which notifies users of the sales system of the items and associated communities for which such popularity level disparities exist, to thereby assist such users in selecting items from the electronic catalog.

14. The system of claim 13, wherein the process comprises a first process which generates a table which contains bestselling items list for at least some of the communities, and a second process which selects items from the table to display to users.

15. The system of claim 13, further comprising a user interface which allows users to select and join at least some of the user communities.

16. The system of claim 13, further comprising a user interface which allows a user to define a composite community that includes multiple communities of the database, and to initiate generation of a popular items list for the composite community.

17. The system of claim 13, wherein at least some of the communities are implicit membership communities.

18. The system of claim 13, wherein at least some of the communities are based on email addresses of users.

19. The system of claim 13, wherein at least some of the communities are based on electronic address books of the users.

20. The system of claim 13, wherein the process generates and displays community bestsellers lists for at least some of the communities.

21. The system of claim 13, wherein the process compares a popularity of an item within a community to a popularity of the item among non-members of the community.

22. The system of claim 13, wherein the process sends to the users notification emails that include descriptions of the items that are popular within particular communities.

23. The system of claim 22, wherein at least some of the notification emails include contact information of users that have purchased items described therein.

24. The system of claim 22, wherein at least some of the notification emails specify a level of acceptance an item has attained within a particular community.

25. The system of claim 13, wherein the process identifies items that are have substantially higher popularity levels within particular communities by at least identifying a set of items purchased by members of a community that distinguishes the community from a general user population.

26. The system of claim 25, wherein the process uses a censored chi-square algorithm to identify the set of items.

27. The system of claim 13, wherein the computer process excludes, substantially, from consideration purchase history data falling outside a selected look-back period.

28. A method of assisting users in selecting items from an electronic catalog of items, the catalog accessible to users of an online sales system that provides services for allowing users to purchase items from the catalog, the method comprising steps, each step performed by computer, of:
  identifying a subset of users of the online sales system that have email addresses that satisfy a particular criterion, wherein the subset comprises a plurality of users;
  identifying at least one item that characterizes the subset of users, wherein the step of identifying comprises processing purchase history data of the subset of users and of users falling outside said subset; and
  electronically notifying users of the online sales system of a relationship between the at least one item and the subset of users, to assist users in selecting items from the electronic catalog.

29. The method of claim 28, wherein identifying a subset of users comprises identifying all users having a selected domain name within their respective email addresses.

30. The method of claim 29, wherein the selected domain name is a domain name of a selected company.

31. The method of claim 28, wherein identifying a subset of users comprises identifying all users that have one of a selected group of domain name within their respective email addresses.

32. The method of claim 28, wherein electronically notifying comprises generating a Web page which includes a list of items that characterize the subset of users.

33. The method of claim 28, wherein electronically notifying comprises sending email notification messages to at least some of the users of the subset.

34. The method of claim 28, wherein identifying at least one item that characterizes the subset of users comprises comparing a popularity level of the item among the subset of users to a popularity level of the item among a general population of users.

35. The method of claim 28, wherein identifying at least one item that characterizes the subset of users comprises identifying a set of items that distinguish the subset from a general population of users.

36. The method as in claim 35, wherein identifying a set of items that distinguish the subset from a general population of users comprises applying a censored chi-square type algorithm to the purchase history data.

37. The method as in claim 28, wherein identifying at least one item that characterizes the subset of users comprises at least one of comparing a velocity of an item within the community to a velocity of the item within a general user population; and comparing an acceleration of the item within the community to an acceleration of the item within a general population.

38. A method of assisting users in selecting items from a catalog of items, comprising:
  electronically identifying a subset of a general population of users;
  tracking, via computer, at least one type of user activity that indicates user affinities for particular items of the catalog to generate activity history data;
  processing, via computer, the activity history data of the general population of users, including the subset of users, to identify a set of items that distinguish the subset from the general population; and
  electronically notifying users of the catalog of a relationship between the set of items and the subset of users, to thereby assist the users of the catalog in selecting items therefrom.

39. The method of claim 38, wherein processing the activity history data comprises processing purchase history data, and the set of items consists essentially of items purchased by members of the subset.

40. The method of claim 38, wherein tracking at least one type of user activity comprises tracking item viewing events.

41. The method of claim 38, wherein processing the activity history data comprises applying a censored chi-square algorithm to the activity history data.

42. The method of claim 38, wherein the subset consists of members of an implicit-membership community.

43. A method of assisting users in selecting items from an electronic catalog of items, comprising:
  electronically identifying among a population of users of the electronic catalog, a subset of users that, based on user shipping addresses, reside in a common geographic region;
  electronically monitoring actions of the subset of users, and of users falling outside the subset, to generate user activity history data reflective of user actions performed with respect to items in the electronic catalog;
  electronically processing the user activity history data to identify an item whose popularity level among the subset of users is substantially higher than a popularity level of the item among the population of users; and
  electronically notifying at least one user that a relationship exists between the item and the geographic region to assist the at least one user in selecting items from the electronic catalog.

44. The method as in claim 43, wherein processing the user activity history data to identify an item whose popularity level among the subset of users is substantially higher than a popularity level of the item among the population of users comprises at least one of (a) comparing a velocity of the item within the subset to a velocity of the item within a general user population; and (b) comparing an acceleration of the item within the subset to an acceleration of the item within a general user population.

45. The method as in claim 43, wherein processing the user activity history data to identify an item whose popularity level among the subset of users is substantially higher than a popularity level of the item among the population of users comprises applying a censored chi-square type algorithm to the user activity history data.

46. The method as in claim 43, wherein notifying at least one user comprises presenting to the user a list of items that are popular in the geographic region relative to popularity levels outside the region.

47. The method as in claim 43, wherein the user actions performed with respect to items in the electronic catalog comprise item purchases.

48. The method as in claim 43, wherein the user actions performed with respect to items in the electronic catalog comprise item viewing events.

49. The method as in claim 43, wherein the geographic region corresponds to a particular city.

50. The method as in claim 43, wherein processing the user activity history data comprises applying a time window to the user activity history data such that a popularity level of the item is measured substantially from a most recent set of the user activity history data.

51. A computer-implemented method of assisting users in selecting items from an electronic catalog of items, the method comprising:

stored email addresses of users of the electronic catalog;

electronically identifying, for each of a plurality of organizations, a respective group of said users who are deemed to be affiliated with the respective organization by virtue of a domain name of the respective organization occurring within an email address of each such user, to thereby identify a plurality of organization-specific groups of users;

electronically tracking at least one type of user activity that indicates user affinities for particular items in the electronic catalog to generate activity history data for the users;

electronically analyzing for each organization-specific group of users, the activity history data to generate a list of items within the electronic catalog that distinguish the organization-specific group from a general population of the users, to thereby generate a plurality of organization-specific popular items lists; and electronically exposing the organization-specific popular items lists to the users of the electronic catalog in association with the organizations to which such popular items lists correspond, to allow users to identify items that are popular within specific organizations.

52. The method as in claim 51, wherein exposing the organization-specific popular items lists to the users comprises providing to a target user a personalized web page that displays organization-specific popular items lists of organizations with which the target user is affiliated.

53. The method as in claim 51, wherein analyzing the activity history data comprises excluding, substantially, from consideration activity history data falling outside a selected look-back period.

54. The method as in claim 51, wherein analyzing the activity history data comprises applying a censored chi-square type algorithm to the activity history data.

55. The method as in claim 51, wherein at least some of the organizations are companies.

56. A system for assisting users in selecting items from an electronic catalog of items, the system comprising:

at least one electronic database which contains email addresses of users of the electronic catalog; and a computer system that executes a computer program to identify, for each of a plurality of organizations, a respective group of said users who are deemed to be affiliated with the respective organization by virtue of a domain name of the respective organization occurring within an email address of each such user, to thereby identify a plurality of organization-specific groups of users;

track at least one type of user activity that indicates user affinities for particular items in the electronic catalog to generate activity history data for the users;

analyze, for each organization-specific group of users, the activity history data to generate a list of items within the electronic catalog that distinguish the organization-specific group from a general population of the users, to thereby generate a plurality of organization-specific popular items lists; and expose the organization-specific popular items lists to the users of the electronic catalog in association with the organizations to which such popular items lists correspond, to allow users to identify items that are popular within specific organizations.

* * * * *

UNITED STATES PATENT AND TRADEMARK OFFICE
CERTIFICATE OF CORRECTION

PATENT NO. : 6,963,850 B1
DATED : November 8, 2005
INVENTOR(S) : Bezos et al.

It is certified that error appears in the above-identified patent and that said Letters Patent is hereby corrected as shown below:

Column 4,
Line 48, replace "user' computers" with -- users' computers --.

Column 17,
Line 15, replace "S—{.99}" with -- $S\_\{.99\}$ --.
Line 23, replace "e(i) = n * phat—i, phat—i" with -- $e(i) = n * phat\_i, phat\_i$ --.
Line 28, replace "Let S—(1), S—(2), ..., S—(d)" with -- Let $S\_(1), S\_(2), ..., S\_(d)$ --.
Line 29, replace "S—(d)" with -- $S\_(d)$ --.
Lines 31-32, replace "S—(i), S—(i+1), ..., S—(i+j)" with – $S\_(i), S\_(i+1), ..., S\_(i+j)$ --.
Lines 33, 35 and 36, replace "S—{c}" with -- $S\_\{c\}$ --.
Line 37, replace "S—{.99}" with -- $S\_\{.99\}$ --.
Line 39, replace "SR—(l), ..., SR—(m)" with -- $SR\_(1), ..., SR\_(m)$ --.
Line 43, replace "SR—{i}^2" with -- $SR\_(i)\^2$ --.
Lines 47-48, replace "SR—(m), SR—(m-1), ..., SR—(r*+1), SR—(r*)" with
-- $SR\_(m), SR (m-1), ..., SR\_(r*+1), SR\_(r*)$ --.

Column 18,
Line 41, replace "ODtimal" with -- Optimal --.

Column 19,
Line 41, after "memory", delete ":" and insert -- ; --.

Column 20,
Line 13, after "excluding", insert -- , --.
Line 36, after "items", delete "list" and insert -- lists --.

Column 21,
Line 2, replace "items that are have" with -- items that have --.
Line 8, after "system", delete "of" and insert -- as in --.
Line 20, remove the line break between "identifying comprises" and "processing purchase history", so that the two associated subparagraphs are combined into a single subparagraph.
Line 33, after "domain" delete "name" and insert -- names --.
Lines 41 and 46, after "system" delete "of" and insert -- as in --.

Column 22,
Line 22, after "identifying" insert -- , --.

UNITED STATES PATENT AND TRADEMARK OFFICE
CERTIFICATE OF CORRECTION

PATENT NO.     : 6,963,850 B1
DATED          : November 8, 2005
INVENTOR(S)    : Bezos et al.

It is certified that error appears in the above-identified patent and that said Letters Patent is hereby corrected as shown below:

<u>Column 23</u>,
Line 20, after "analyzing" insert -- , --.

Signed and Sealed this

Twenty-first Day of March, 2006

JON W. DUDAS
*Director of the United States Patent and Trademark Office*